Nov. 8, 1955 A. K. ANTONSEN 2,723,003
CRANKSHAFT BEARING LUBRICATION
Filed July 17, 1952 2 Sheets-Sheet 1

INVENTOR
ANKER K. ANTONSEN
BY
ATTY.

United States Patent Office 2,723,003
Patented Nov. 8, 1955

2,723,003

CRANKSHAFT BEARING LUBRICATION

Anker K. Antonsen, Beloit, Wis., assignor to Fairbanks, Morse & Co., Chicago, Ill., a corporation of Illinois Application July 17, 1952, Serial No. 299,326

6 Claims. (Cl. 184—6)

This invention relates to bearings, and more particularly to improvements in sleeve type bearings such as are adapted for use as main bearings for crankshafts of internal combustion engines and the like.

It is an object of the present invention to provide in a bearing of the form indicated, improved lubricant distribution means whereby areas on the inner bearing surface relatively remote from the region or point of lubricant supply to the bearing, will receive lubricant in quantity sufficient to maintain effective films of oil on such inner bearing surface areas.

Another object is to provide an improved bearing assembly constructed such as to afford adequate bearing surface areas and bearing strength in the zone of the bearing normally subjected to maximum bearing pressures in crankshaft operation, while at the same time affording effective crankshaft-bearing lubrication in these areas.

A further object is to provide for an engine crankshaft having a lubricant transfer passage extending between the main and crankpin journals of the shaft, an improved main bearing arrangement adapted for lubricant feed to such transfer passage and to prevent closing off of the passage at any point in crankshaft rotation, the latter serving in particular, to prevent lubricant entrapment in the transfer passage which if otherwise permitted, would result in hydraulic hammer action of the trapped fluid tending to produce more or less serious erosive damage to the bearing surface areas traversed by the end of the transfer passage.

Accordingly, the present invention features a bearing of the type described, wherein radially extending ports in that portion of the bearing relatively remote from the portion containing a lubricant supply channel, admit oil to the inner bearing surface of such remote portion for maintaining an effective film of oil on the main journal of the crankshaft. The said ports are so constructed and arranged that adequate bearing surface remains in contact with the main journal to provide adequate bearing support for the crankshaft sufficient to withstand maximum crankshaft bearing pressures. The bearing so constructed, is particularly novel in that the aforesaid ports permit substantially unrestricted flow of the lubricant in the transfer passage between the main and crankpin journals, thereby preventing the previously mentioned lubricant hammer effect and resultant bearing surface erosion.

Further objects and advantages of this invention will appear or be apparent to one skilled in the art from the following description, reference being made to the accompanying drawings, in which.

Figure 1:
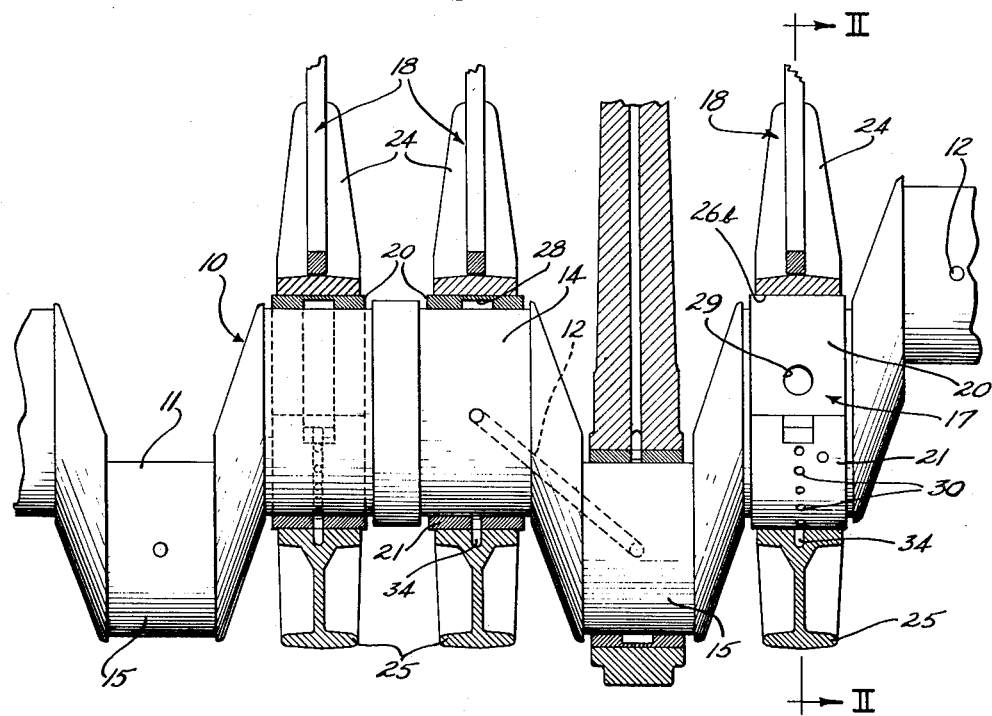
Fig. 1 illustrates a crankshaft and bearing assembly embodying the present improvements, the crankshaft being shown in longitudinal elevation while parts of the bearings appear in section.

Referring to the drawings, reference numeral 10 designates a crankshaft having crank or crankpin portions 11 and having the usual lubricant feed or transfer passages 12 bored therethrough (only one such passage being shown). The transfer passage 12 communicates the main crankshaft bearing surface or journal 14 with the crankpin journal 15.

Each main journal of the crankshaft is supported for rotation in a bearing 17 carried by a stationary support member 18. The said main bearing 17 has separable upper and lower bearing shells 20 and 21 respectively (Figs. 2 and 3), which cooperate to form an inner bearing surface 22 for a main journal. Likewise, the stationary support member or bearing housing 18 has relatively separable upper and lower bearing housings 24 and 25 respectively, which cooperate to form an inner bearing seating surface 26 for housing said main bearing and thereby supporting said crankshaft.

The upper bearing shell 20, being of semi-cylindrical structure, has an inner bearing surface 22a provided with a centrally located channel 28, said channel extending in a plane transverse to the bearing axis and being continuous from end to end of said bearing surface. Also, located in the upper bearing shell is a port or lubricant feed passage 29 opening to the channel 28, whereby the said channel is placed in communication with the back, or outer surface of said shell.

The lower bearing shell 21, being of semi-cylindrical structure, has an inner bearing surface 22b which upon assembly of the bearing shells in bearing housing 18, cooperates with the inner bearing surface 22a of the said upper shell to provide an inner bearing surface 22 for the main journal 14, as previously mentioned. The said lower bearing shell has radially extending ports 30, centrally located and in a plane transverse to the bearing axis. The said ports, preferably spaced as indicated in the drawings (Figs. 2 and 4), communicate the back or outer surface of said shell with the inner bearing surface 22b, said inner surface having a centrally located, relatively shallow recess or groove 32 into which the said ports open. The ends of the said lower bearing shell are provided with centrally located recesses or cross grooves 33 the purpose for which will be fully discussed hereafter.

The lower bearing housing 25 is formed with a recessed portion thereby providing a bearing seating surface 26a adapted to receive and carry the lower bearing shell 21. The bearing seating surface 26a has a centrally located groove or channel 34, extending in a plane transverse to the bearing axis and being continuous from end to end of said seating surface. Upon assembly of the lower bearing shell and lower bearing housing, the back or outer surface of said shell cooperates with the said groove to provide a passage for oil. The said lower bearing housing is provided also with a bore 36 preferably located near one end of the seating surface 26a and which, upon assembly of the lower bearing shell and lower bearing housing, is aligned with a similar bore 37 in said lower bearing shell. A dowel pin (not shown) disposed in said aligned bores, provides means for securing said shell to said housing in a manner such as to prevent rotary and creeping movement of this shell, and hence of the upper shell as well.

Figure 2:
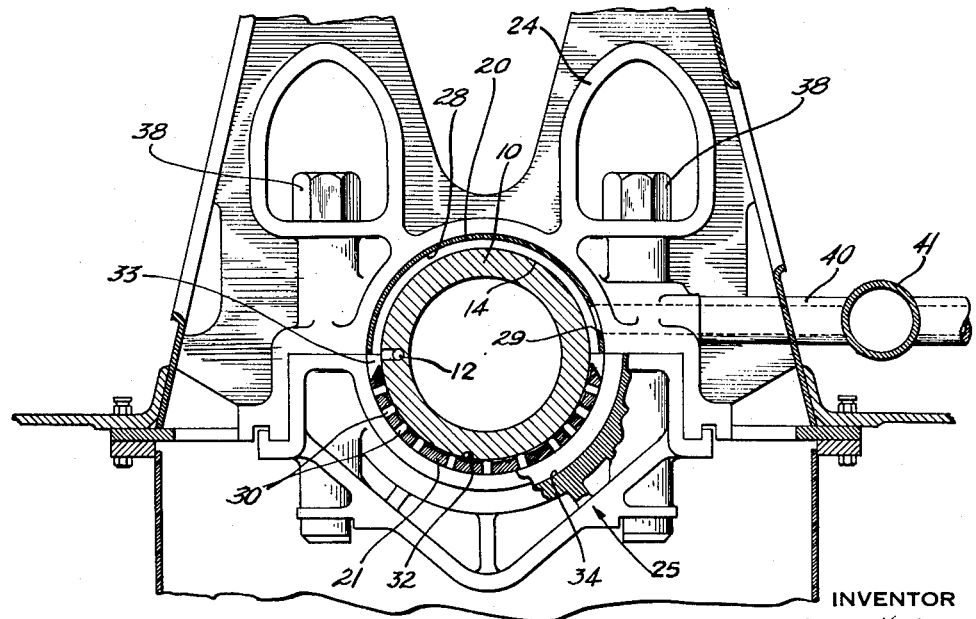
Fig. 2 is a transverse sectional view taken substantially on line 2—2 of Fig. 1.
Figure 3:
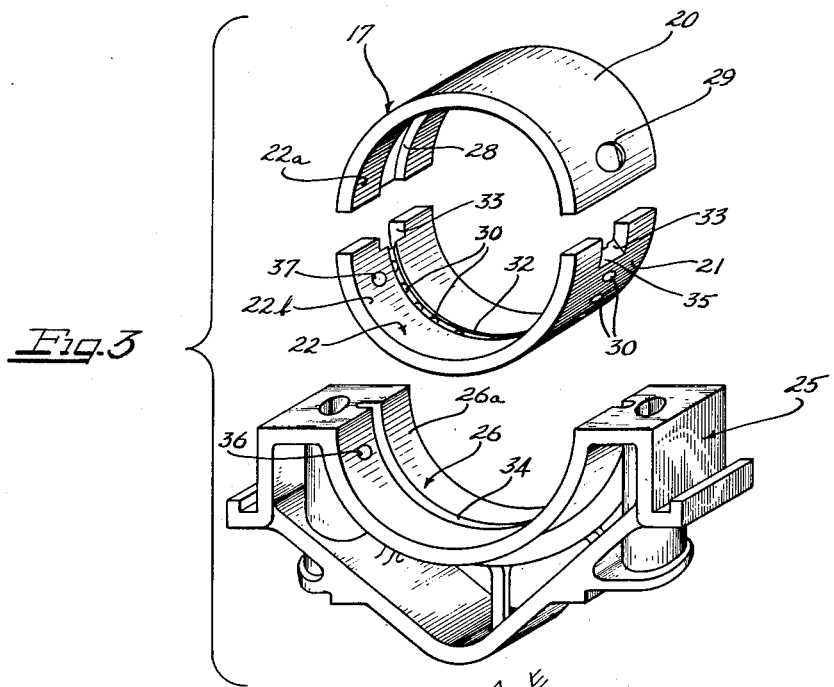
Fig. 3 is an exploded view of the bearing shells and the lower bearing housing in perspective projection.

The upper bearing housing 24 is mounted on or preferably formed as a part of the engine frame, and is provided with bolts 38 for securing and retaining the lower bearing housing 25 in assembly position, as seen in Fig. 2. The said upper bearing housing is recessed, providing a bearing seating surface 26b adapted to receive the upper bearing shell 20. Any suitable means, such as a sub-manifold or conduit 40 leading from a main manifold 41 containing lubricating oil under suitable pressure, may be used to conduct oil to that region of the bearing seating surface 26b adjacent the oil passage 29 of said upper bearing shell.

As can best be seen in Fig. 2, oil conducted by means of sub-manifold 40 to the bearing assembly, is admitted to the channel 28 through oil passage 29, and thereby directed onto the main journal 14 of crankshaft 10. The said channel, being disposed in that portion of the crankshaft sleeve bearing normally subjected to less than maximum crankshaft bearing pressures, may be of such dimensions or design as to accommodate lubricant in volume sufficient to assure an adequate distribution thereof in bearing lubrication and delivery in required volume through the transfer passage 12.

The ends of said channel 28 are disposed adjacent the cross-grooves 33 whereby to communicate the upper shell channel with the lower housing groove 34. As shown, the cross-grooves 33 have angulate or downwardly and outwardly inclined lower walls 35 designed to direct the flow of lubricant from the channel 28 into the groove 34.

By means of the spaced, radially extending ports 30 provided in the lower bearing shell 21, the said lower housing groove 34 is placed in communication with the inner bearing surface 22b, admitting oil thereto. Moreover, in order to prevent undue crankshaft wear of the lower bearing shell in the areas immediately about each of the ports 30, these ports open into the relatively shallow recess or groove 32 heretofore mentioned as being provided in the bearing shell surface 22b. This groove extends from end to end of the bearing shell and preferably opens to each of the cross-grooves 33, while the width thereof is uniform and approximately equal to the diameter of the ports 30.

Figure 4:
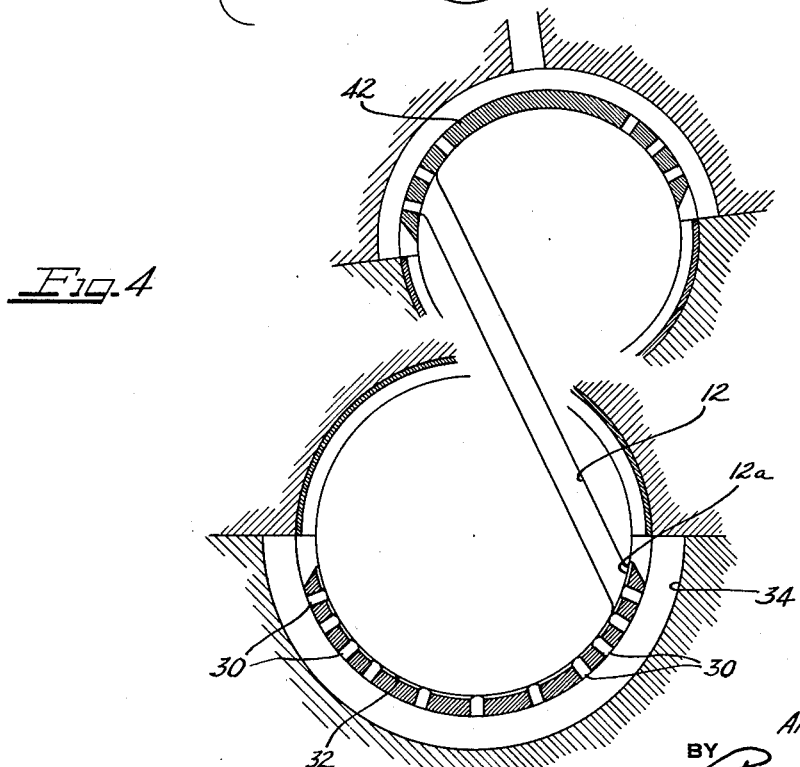
Fig. 4 is a schematic view of a main and crankpin bearing of a crankshaft, indicating the lubricant transfer passage communicative therewith.

Fig. 4 is a schematic view of a main and crankpin bearing of a crankshaft, indicating the lubricant transfer passage communicative therewith. The main bearing 17 is an embodiment of the present invention, and for purposes of illustration the crankpin bearing 42 may be of similar construction. The radially extending ports 30 spaced as indicated by the drawings, and the shallow groove 32 afford lubricant flow communication between the lubricant transfer passage 12 and groove 34. The said ports and shallow groove are in the path traversed by the transfer passage opening 12a in crankshaft operation, thereby preventing a closing off of said passage in its travel over the lower bearing shell. Accordingly, since in the travel of the passage end 12a over the upper bearing shell it is full open to the channel 28, the transfer passage is at no time closed at its end 12a. Consequently, a hydraulic hammer condition cannot develop in the transfer passages, so that bearing surface erosion at either bearing shell is thus avoided. While but one passage 12 is shown in Fig. 4, it is to be understood that more than one such passage may be employed in the manner illustrated.

From the foregoing it will be apparent that the construction of a main bearing as described, provides for proper and adequate lubricant distribution to the main journal of the crankshaft, and affords sufficient support for the crankshaft particularly in zones of maximum crankshaft bearing pressures.

Having now described and illustrated a presently preferred embodiment of the invention, what is claimed is:

1. In combination, a bearing divided into upper and lower bearing shells, said shells being of semi-cylindrical structure, relatively separable upper and lower bearing housings having bearing seating surfaces adapted to receive said shells, means for securing said shells and housings in assembly position with the shells providing an inner bearing surface for a shaft, the upper bearing shell having a centrally located channel in the inner bearing surface thereof extending in a plane transverse to the bearing axis and being continuous from end to end of said bearing surface, means for supplying lubricant to said channel, the lower bearing housing having a centrally located groove in the bearing seating surface thereof extending in a plane transverse to the bearing axis and being continuous from end to end of said seating surface, the lower bearing shell having a shallow groove in its inner bearing surface and radially extending ports communicating said housing groove with said shallow groove and the inner bearing surface of said shell, and passage means communicating said lower housing groove with said upper shell channel, said shallow groove extending to communication with said passage means.

2. In combination, a bearing divided into upper and lower bearing shells, said shells being of semi-cylindrical structure, relatively separable upper and lower bearing housings having bearing seating surfaces adapted to receive said shells, means for securing said shells and housings in assembly position with the shells providing an inner bearing surface for a shaft, the upper bearing shell having a centrally located channel in the inner bearing surface thereof extending in a plane transverse to the bearing axis and being continuous from end to end of said bearing surface, means for supplying lubricant to said channel, said lubricant supplying means including a lubricant feed port in said upper shell opening to said channel, the lower bearing housing having a centrally located groove in the bearing seating surface thereof extending in a plane transverse to the bearing axis and being continuous from end to end of said seating surface, the lower bearing shell having radially extending ports communicating said housing groove with the inner bearing surface of said shell, the inner bearing surface of the lower bearing shell being provided with a recess into which the said ports open, and the ends of said lower bearing shell being formed to provide end recesses for communicating the upper bearing shell channel with the lower bearing housing groove.

3. In a bearing assembly for a shaft, a bearing support, a sleeve bearing carried by the support, said sleeve bearing being formed to provide a channel in the inner shaft engaging surface thereof and extending along approximately half the circumference of the sleeve bearing, a plurality of ports in the wall portion of the sleeve bearing opposite the portion containing said channel, said bearing support having a groove in registry with said plurality of ports, the groove terminating in end portions adjacent the corresponding ends of said channel, a pair of passage means in the sleeve bearing each communicating one end portion of the groove with the adjacent corresponding end of said channel, and said sleeve bearing having a shallow groove in the said wall portion thereof containing said plurality of ports, said shallow groove communicating with said ports and extending to communication at its ends with said passage means.

4. In a bearing assembly for a shaft, a bearing support, a sleeve bearing carried by the support, said sleeve bearing having a channel in the inner shaft engaging surface thereof extending along the upper half circumference of the sleeve bearing, the sleeve bearing further having a plurality of ports through the wall thereof in relatively spaced relation over substantially the remaining lower half of the sleeve bearing circumference, said bearing support providing a groove of substantially semi-circular extent underlying the portion of the sleeve bearing having said ports therein, said groove being in communication with said ports and terminating in end portions adjacent the corresponding ends of said channel, and said sleeve bearing having a pair of passage means each directly communicating one end portion of the groove with the adjacent corresponding end of said channel.

5. In a bearing assembly as defined by claim 4, further characterized by said sleeve bearing providing a lubricant admission port open to the said channel thereof, and lubricant supply conduit means in the bearing support extending to communication with said admission port.

6. A main bearing assembly for an engine crankshaft having a main journal, a crankpin journal and a lubricant transfer passage open at its ends to the main and crankpin journals, the bearing assembly comprising a bearing support, a main journal sleeve bearing carried by the support, said sleeve bearing having a lubricant channel in the main journal engaging surface thereof extending along approximately half the circumference of the bearing surface, and having a plurality of ports through the wall thereof and in circumferentially spaced relation substantially throughout the remaining half of the bearing surface circumference, the sleeve bearing further having a relatively shallow channel in its main journal engaging surface and extending along the said remaining half of the bearing surface circumference, said plurality of ports opening in said shallow channel, said bearing support providing a groove of substantially semi-circular extent underlying the sleeve bearing portion containing said ports, and the sleeve bearing having passage means communicating adjacent ends of said lubricant channel and groove, said lubricant channel and said ports and shallow channel being in a common plane transversely through the sleeve bearing and disposed in the path traversed in crankshaft rotation, by the end of said lubricant transfer passage open to the main journal of the crankshaft.

References Cited in the file of this patent

UNITED STATES PATENTS

| | | |
|---|---|---|
| 1,117,256 | Schwitzer | Nov. 17, 1914 |
| 1,748,120 | Fisher | Feb. 25, 1930 |
| 2,004,254 | Taub | June 11, 1935 |

FOREIGN PATENTS

| | | |
|---|---|---|
| 450,786 | Great Britain | July 24, 1936 |
| 664,788 | Germany | Sept. 8, 1938 |